(12) United States Patent
Vosoughi et al.

(10) Patent No.: US 11,270,470 B2
(45) Date of Patent: Mar. 8, 2022

(54) COLOR LEAKING SUPPRESSION IN ANCHOR POINT CLOUD COMPRESSION

(71) Applicant: Sony Corporation, Tokyo (JP)

(72) Inventors: Arash Vosoughi, San Jose, CA (US); Ali Tabatabai, Cupertino, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/107,654

(22) Filed: Aug. 21, 2018

(65) Prior Publication Data
US 2019/0114809 A1    Apr. 18, 2019

Related U.S. Application Data

(60) Provisional application No. 62/571,530, filed on Oct. 12, 2017.

(51) Int. Cl.
*G06K 9/36* (2006.01)
*G06T 9/40* (2006.01)
*G06T 7/90* (2017.01)
*H04N 1/60* (2006.01)
*G06K 9/62* (2022.01)
*H04N 19/59* (2014.01)
*H04N 19/132* (2014.01)
*H04N 19/136* (2014.01)
*H04N 19/186* (2014.01)
*H04N 1/64* (2006.01)

(52) U.S. Cl.
CPC .............. *G06T 9/40* (2013.01); *G06K 9/6223* (2013.01); *G06T 7/90* (2017.01); *H04N 1/6005* (2013.01); *H04N 1/6016* (2013.01); *H04N 19/132* (2014.11); *H04N 19/136* (2014.11); *H04N 19/186* (2014.11); *H04N 19/59* (2014.11); *H04N 1/646* (2013.01)

(58) Field of Classification Search
CPC .......... G06T 9/40; G06T 7/90; H04N 1/6016; H04N 19/59; H04N 19/132; H04N 19/136; H04N 19/186; H04N 1/6005; H04N 1/646; G06K 9/6223
USPC ....................................................... 382/240
See application file for complete search history.

(56) References Cited

U.S. PATENT DOCUMENTS

| | | |
|---|---|---|
| 5,341,442 A | 8/1994 | Barrett |
| 7,548,647 B2 | 6/2009 | Whitman |
| 2006/0092474 A1 | 5/2006 | Ramsay et al. |
| 2010/0208989 A1* | 8/2010 | Narroschke ............ H04N 1/646 382/166 |
| 2015/0195526 A1* | 7/2015 | Zhu ....................... H04N 19/167 375/240.14 |
| 2016/0360212 A1* | 12/2016 | Dai ....................... H04N 19/186 |

* cited by examiner

*Primary Examiner* — Huy C Ho
(74) *Attorney, Agent, or Firm* — Haverstock & Owens, A Law Corporation (57) ABSTRACT

The color coding approach adopted by the Anchor Point Cloud Compression (PCC) leads to a significant color distortion, even at very low compression ratios. This color distortion is also referred to as color leaking. Two approaches are able to mitigate the color leaking. Both approaches reduce the color leaking significantly, while one of them (e.g., 1D subsampling) is more robust and preferred in most cases. A more general approach is an adaptive selection between these two approaches.

20 Claims, 11 Drawing Sheets

COLOR LEAKING SUPPRESSION IN ANCHOR POINT CLOUD COMPRESSION

CROSS-REFERENCE TO RELATED APPLICATION(S)

This application claims priority under 35 U.S.C. § 119(e) of the U.S. Provisional Patent Application Ser. No. 62/571,530, filed Oct. 12, 2017 and titled, "COLOR LEAKING SUPPRESSION IN ANCHOR POINT CLOUD COMPRESSION," which is hereby incorporated by reference in its entirety for all purposes.

FIELD OF THE INVENTION

The present invention relates to data compression. More specifically, the present invention relates to point cloud compression.

BACKGROUND OF THE INVENTION

Point clouds are huge data sets of three dimensional points including information such as color and distance. The point clouds are able to be acquired frequently such as when using LIght Detection And Ranging (LIDAR) on a moving vehicle which repeatedly acquires point clouds. Compressing the vast amount of point cloud data is important to enable practical processing of the data.

SUMMARY OF THE INVENTION

The color coding approach adopted by the Anchor Point Cloud Compression (PCC) leads to a significant color distortion, even at very low compression ratios. This color distortion is also referred to as color leaking. Two approaches are able to mitigate the color leaking. Both approaches reduce the color leaking significantly, while one of them (e.g., 1D subsampling) is more robust and preferred in most cases. A more general approach is an adaptive selection between these two approaches.

In one aspect, a method comprises converting image data from an RGB color model to a YUV color model, decimating a chroma component time series of the YUV color model to generate a YUV420 image and encoding the YUV420 image. Decimating the chroma component time series is by a factor of 4 or 2, where 4 corresponds to a 4:2:0 sample layout and a 2 corresponds to a 4:2:2 sample layout. Encoding the YUV420 image includes separating the luma and chroma samples of the YUV420 image into blocks and scanning the blocks with a snake pattern. Encoding the YUV420 image utilizes a JPEG encoder. The method further comprises decoding the encoded YUV420 image. Decoding the encoded YUV420 image includes: decoding the encoded YUV420 image with a JPEG decoder, up-sampling the chroma component time series and converting the YUV color model to the RGB color model to reconstruct the image data. Up-sampling the chroma component time series is by a factor of 4 or 2, where 4 corresponds to a 4:2:0 sample layout and a 2 corresponds to a 4:2:2 sample layout. Up-sampling the chroma component time series includes 1D interpolation.

In another aspect, an apparatus comprises a non-transitory memory for storing an application, the application for: converting image data from an RGB color model to a YUV color model, decimating a chroma component time series of the YUV color model to generate a YUV420 image and encoding the YUV420 image and a processor coupled to the memory, the processor configured for processing the application. Decimating the chroma component time series is by a factor of 4 or 2, where 4 corresponds to a 4:2:0 sample layout and a 2 corresponds to a 4:2:2 sample layout. Encoding the YUV420 image includes separating the luma and chroma samples of the YUV420 image into blocks and scanning the blocks with a snake pattern. Encoding the YUV420 image utilizes a JPEG encoder. The apparatus further comprising decoding the encoded YUV420 image. Decoding the encoded YUV420 image includes: decoding the encoded YUV420 image with a JPEG decoder, up-sampling the chroma component time series and converting the YUV color model to the RGB color model to reconstruct the image data. Up-sampling the chroma component time series is by a factor of 4 or 2, where 4 corresponds to a 4:2:0 sample layout and a 2 corresponds to a 4:2:2 sample layout. Up-sampling the chroma component time series includes 1D interpolation.

In another aspect, a system comprises a first computing device configured for: converting image data from an RGB color model to a YUV color model, decimating a chroma component time series of the YUV color model to generate a YUV420 image and encoding the YUV420 image and a second computing device configured for: decoding the encoded YUV420 image, up-sampling the chroma component time series and converting the YUV color model to the RGB color model to reconstruct the image data. Decimating the chroma component time series is by a factor of 4 or 2, where 4 corresponds to a 4:2:0 sample layout and a 2 corresponds to a 4:2:2 sample layout. Encoding the YUV420 image includes separating the luma and chroma samples of the YUV420 image into blocks and scanning the blocks with a snake pattern. Encoding the YUV420 image utilizes a JPEG encoder. The system further comprises decoding the encoded YUV420 image. Up-sampling the chroma component time series is by a factor of 4 or 2, where 4 corresponds to a 4:2:0 sample layout and a 2 corresponds to a 4:2:2 sample layout. Up-sampling the chroma component time series includes 1D interpolation.

DETAILED DESCRIPTION OF THE PREFERRED EMBODIMENT

The color coding approach adopted by the Anchor Point Cloud Compression (PCC) leads to a significant color distortion, even at very low compression ratios. This color distortion is also referred to as color leaking. Two approaches are able to mitigate the color leaking. Both approaches reduce the color leaking significantly, while one of them (e.g., 1D subsampling) is more robust and preferred in most cases. A more general approach is an adaptive selection between these two approaches.

Figure 1:
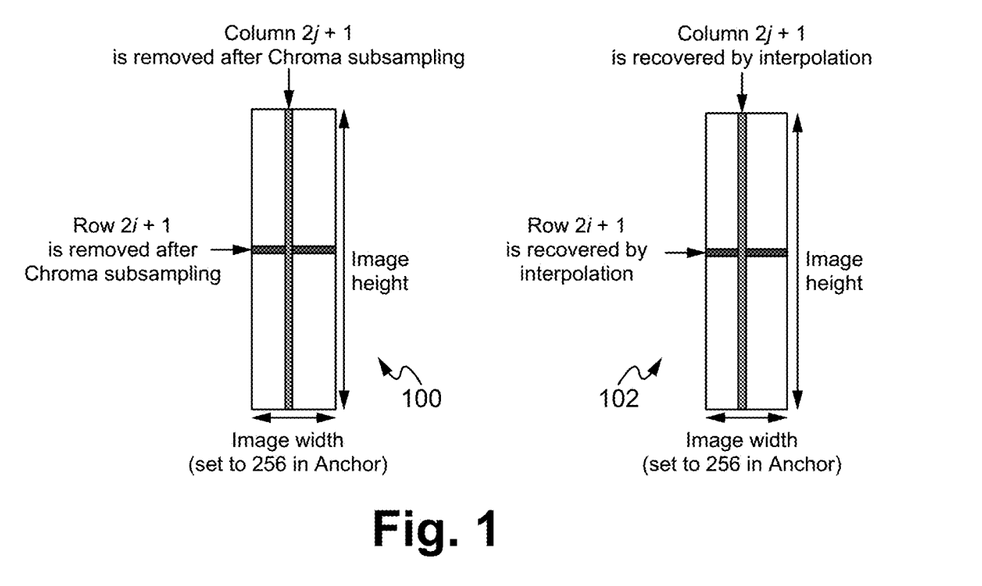
FIG. 1 illustrates chroma subsampling at the encoder and chroma up-sampling at the decoder according to some embodiments.

Anchor PCC serializes color data, puts the color data into an image, and then compresses that image by JPEG. This incurs a significant artifact referred to as "color leaking." As described herein, color leaking originates from the Chroma subsampling that is internally done in the JPEG adopted by Anchor PCC (JPEG converts an RGB input to YUV4:2:0 by default). Color leaking simply happens because of the Chroma subsampling. In FIG. 1, color samples are put in Cb and Cr planes after zig-zag scanning proposed by the Anchor. After Chroma subsampling, rows 2i+1 and columns 2j+1 are removed, in diagram 100. At the decoder, up-sampling (e.g., interpolation) is done to recover the rows and columns removed at the encoder. Through up-sampling, rows 2i+1 and columns 2j+1 are interpolated using their neighboring pixels in the image, in diagram 102. The key point is that the neighboring points in the image are not necessarily neighbors in their 3D positions. Consequently, interpolation leads to leaking of colors from other areas of the cloud to rows 2i+1 and columns 2j+1, which are not necessarily 3D neighbors of the points mapped to rows 2i+1 and columns 2j+1.

Figure 2:
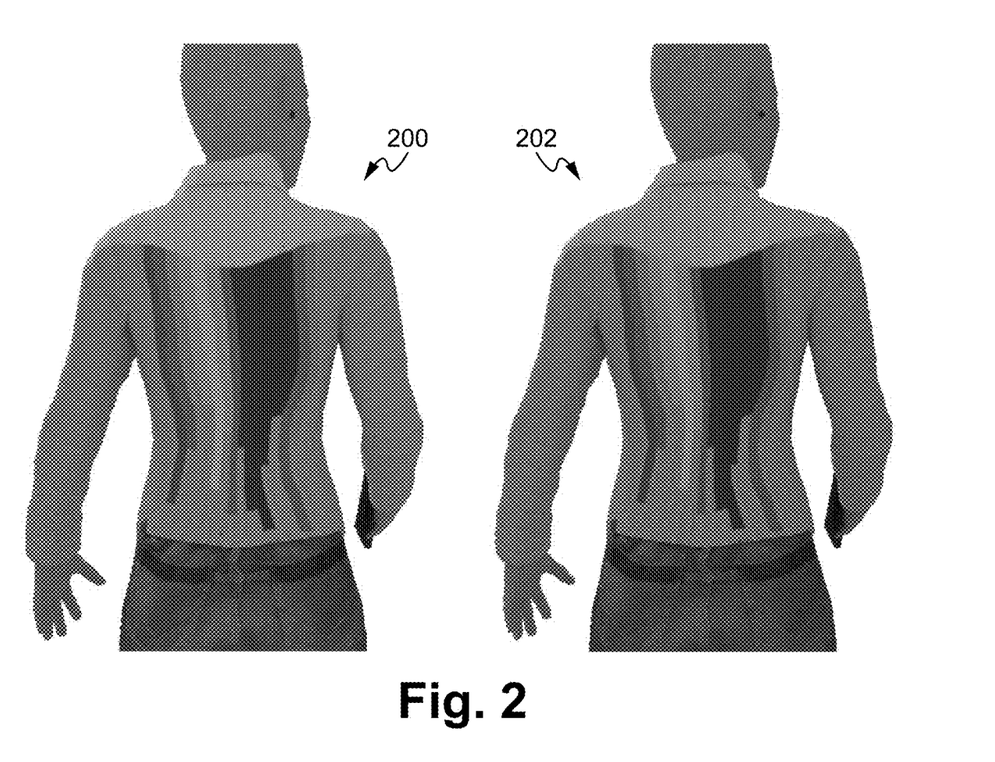
FIG. 2 and FIG. 3 illustrate examples of color leaking at the output of Anchor and examples based on the color leaking suppression implementation according to some embodiments.
Figure 3:
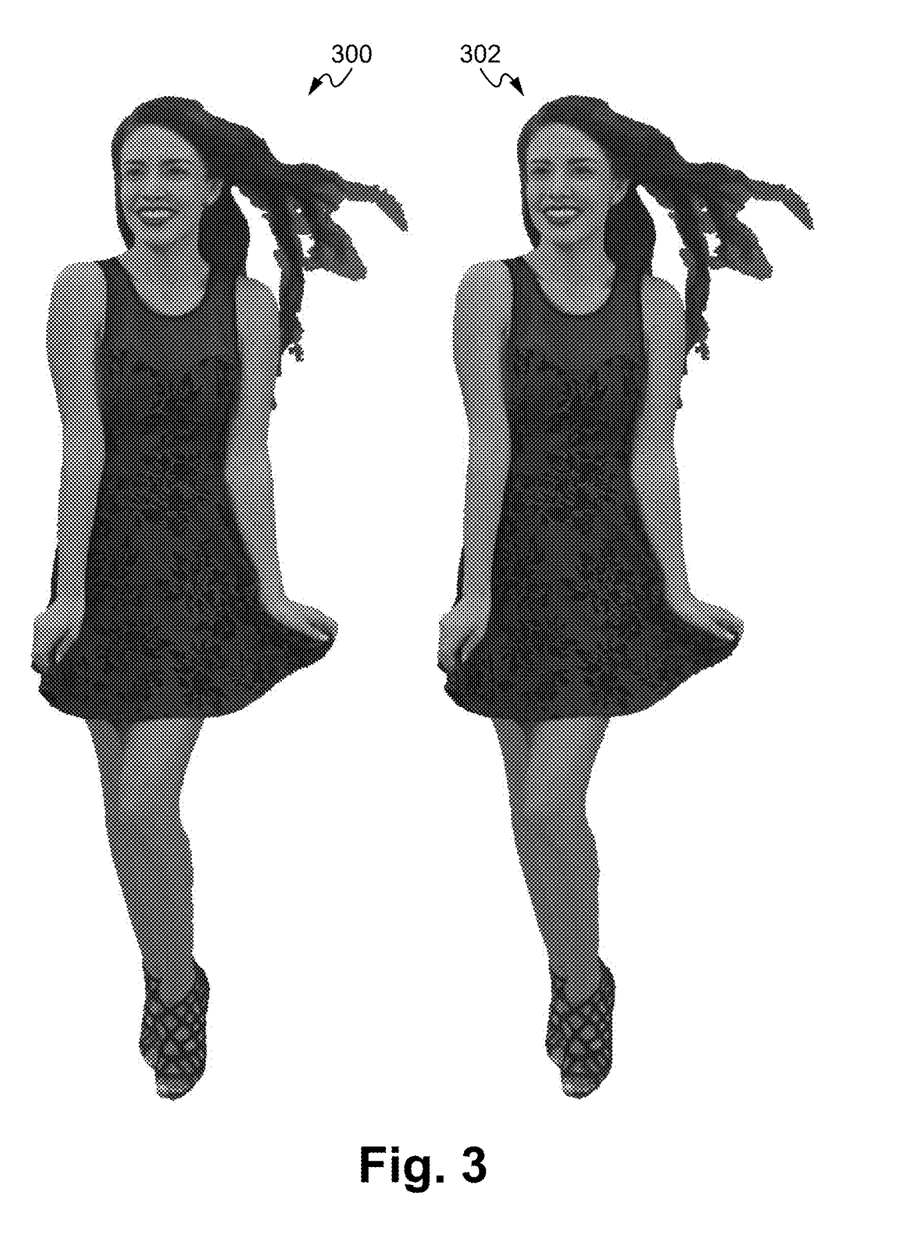

FIG. 2 and FIG. 3 show examples of color leaking at the output of Anchor (image 200 and image 300). These are obtained for the JPEG quality parameter of 95 (which corresponds to a very high JPEG quality). Color leaking appears as noisy patterns, which are in fact colors leaking from some other parts of the cloud to the noisy areas. FIG. 2 and FIG. 3 also show examples based on the color leaking suppression implementation (image 202 and image 302).

Color Leaking Reduction

Two approaches to combat the color leaking are described herein.

4:4:4 Sampling Rather than 4:2:0

One solution to combat color leaking is to avoid doing chroma subsampling, e.g., to avoid RGB to YUV4:2:0 conversion which is internally done in JPEG by default. The method described herein is thus to use JPEG-4:4:4 rather than JPEG-4:2:0. HEVC-4:2:0 and HEVC-4:4:4 are also able to be used in place of JPEG-4:2:0 and JPEG-4:4:4 which provide higher coding gains. RD curves are given in FIG. 5, where "cm1_octree" represents Anchor with JPEG-420, and "cm11_octree" represents Anchor with JPEG-444. C0, C1, C2 represent Y, Cb, and Cr components, respectively. It is observed that cm11_octree outperforms cm1_octree with regard to the chroma components. However, a performance loss is noticed in the Y component.

1D Subsampling of Chroma Components

Figure 4:
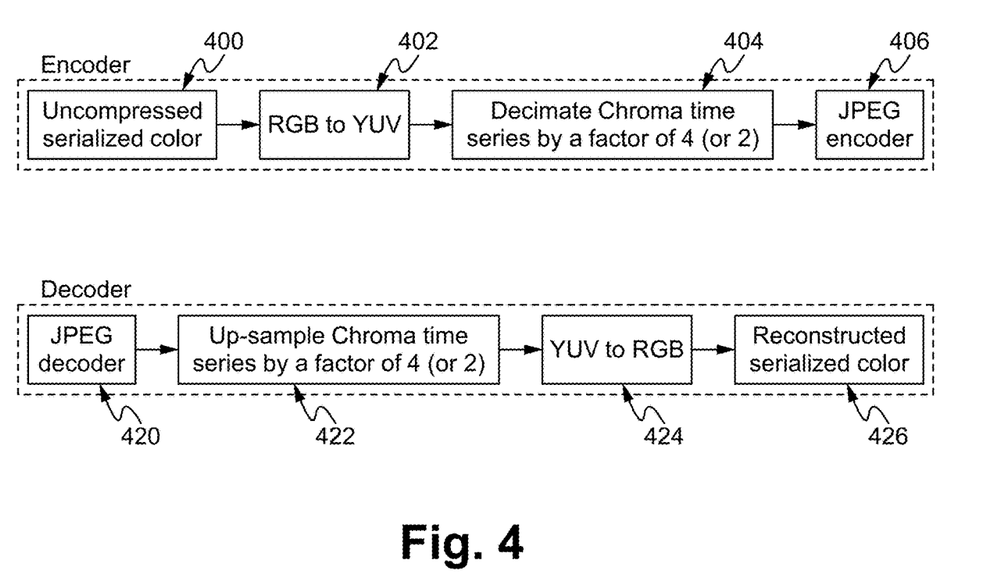
FIG. 4 illustrates the flowchart of the 1D subsampling approach according to some embodiments.
Figure 5A:
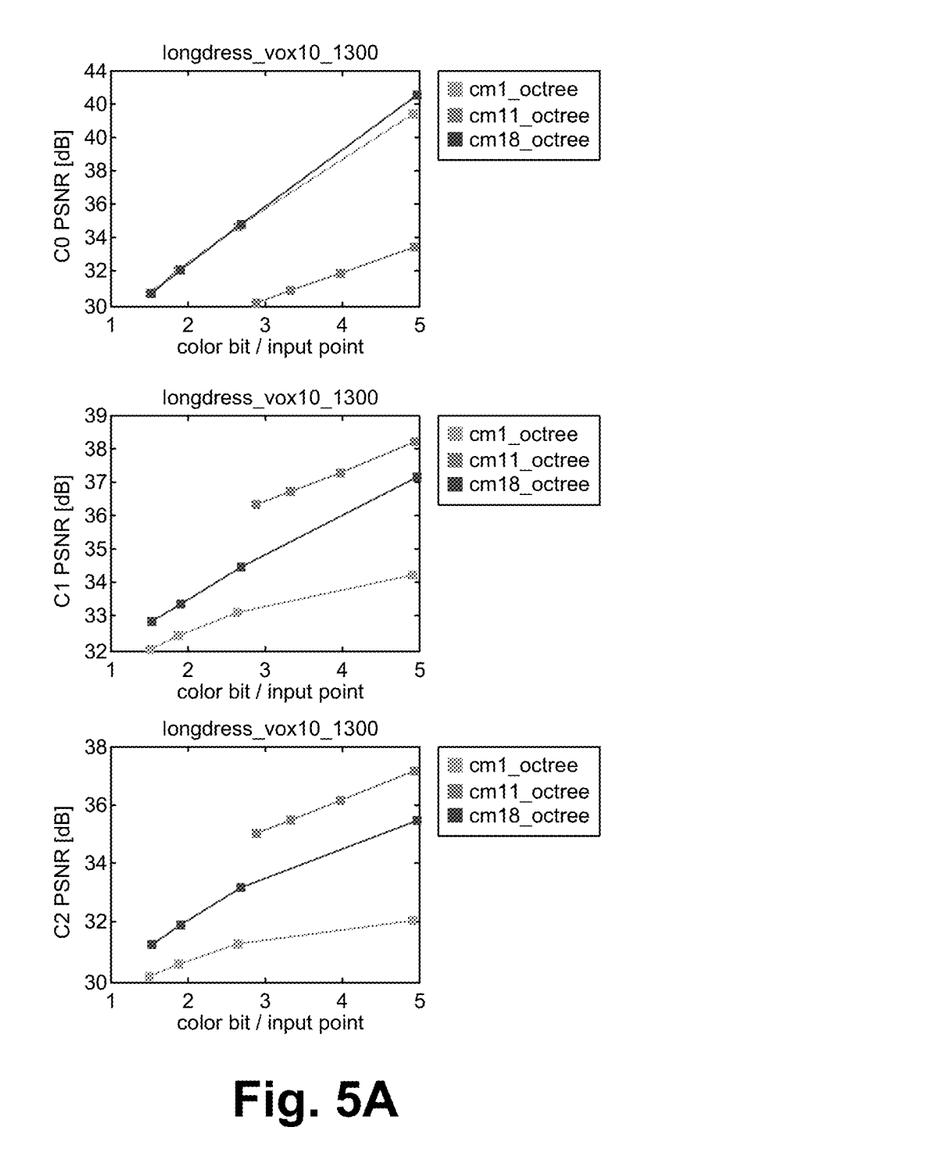
FIGS. 5A-E illustrate RD curves of the color leaking suppression implementation according to some embodiments.
Figure 5B:
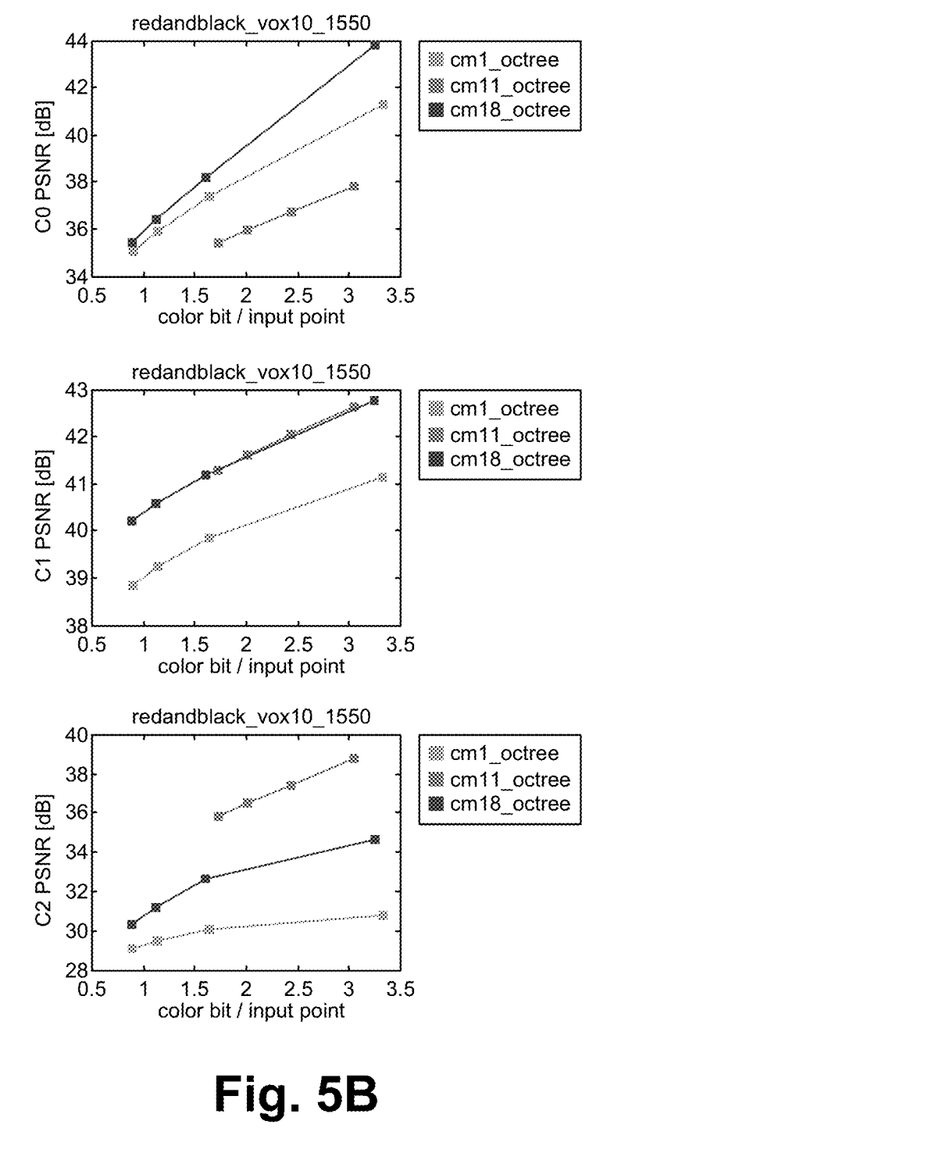
Figure 5C:
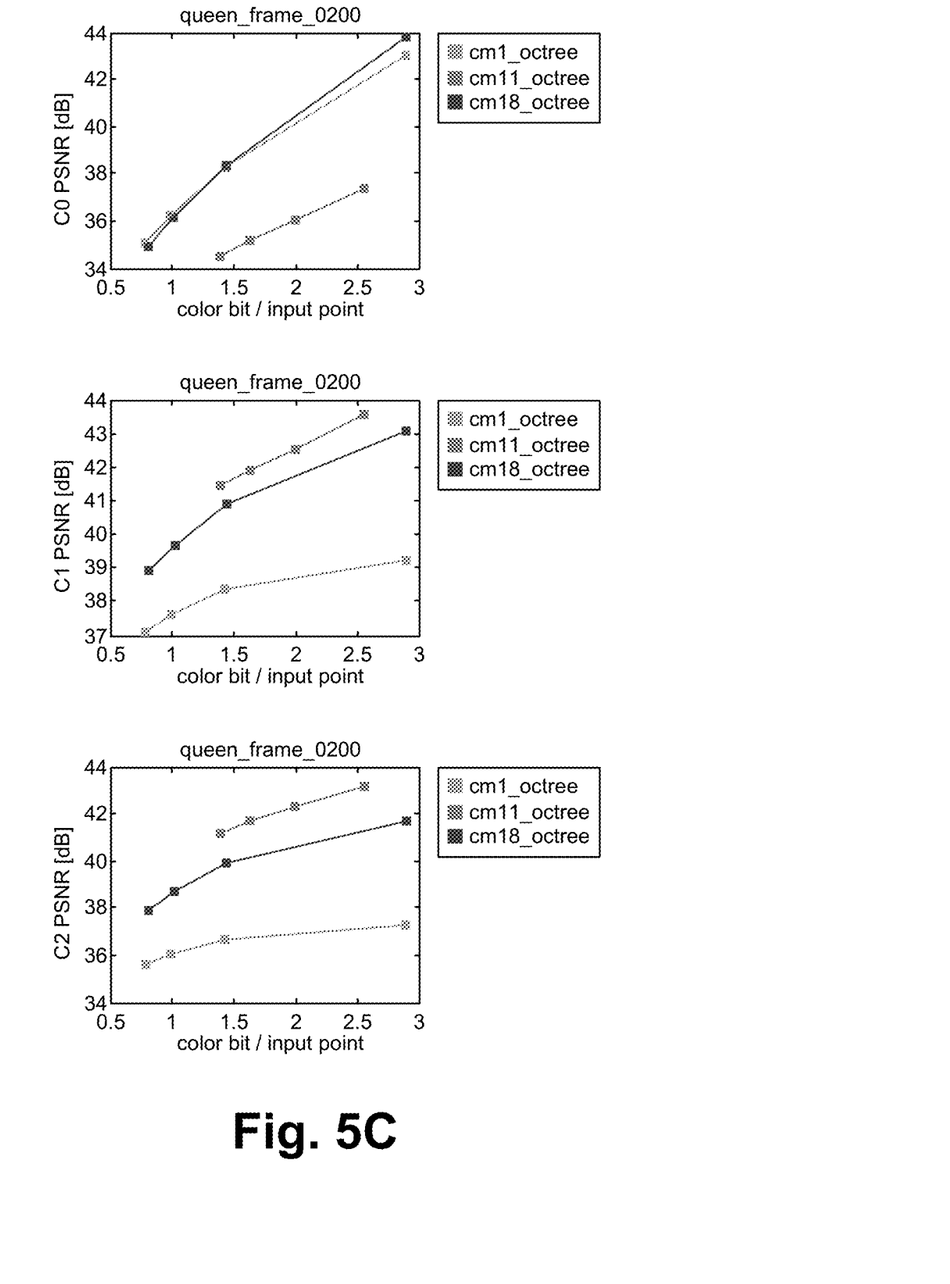
Figure 5D:
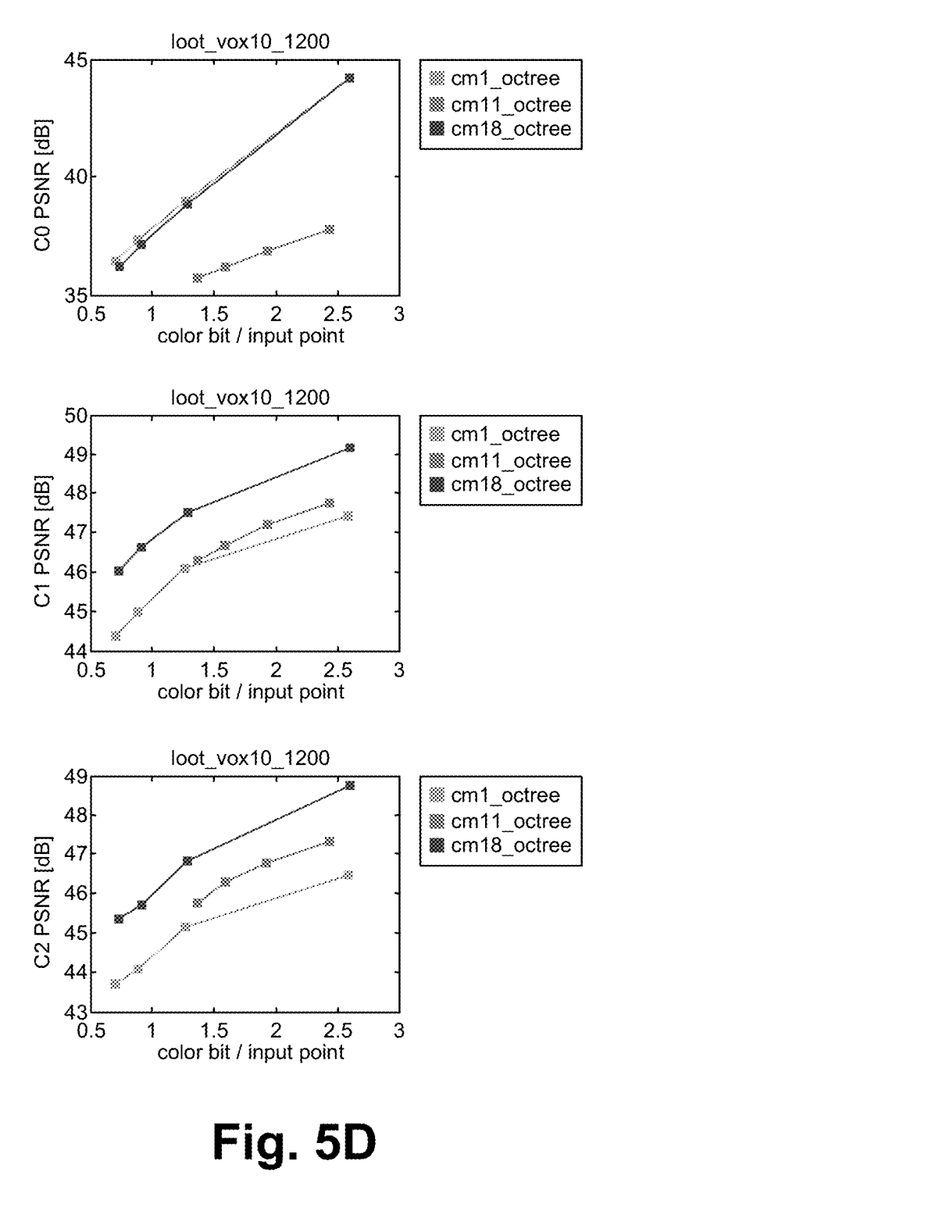
Figure 5E:
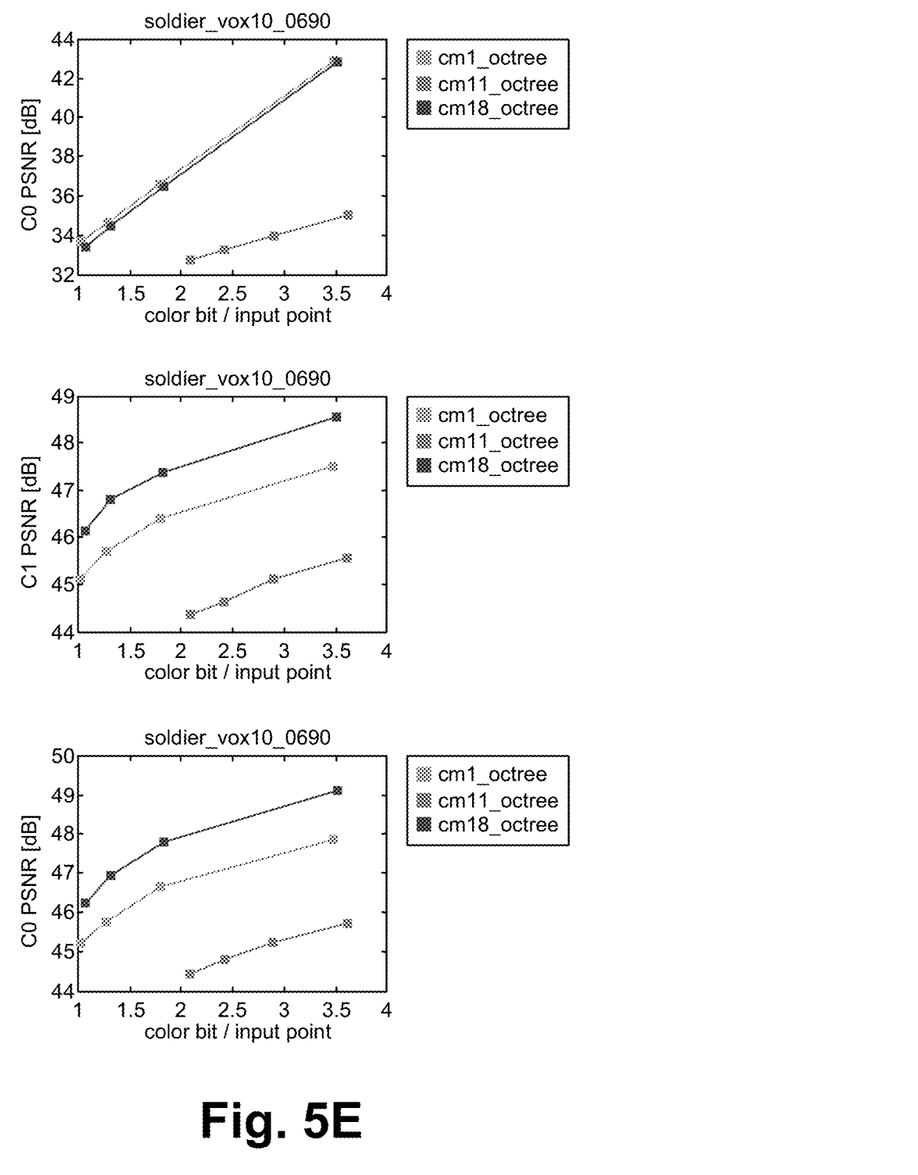

Another approach to address the issue of color leaking: 1D subsampling of the chroma components of the serialized color data is described herein. FIG. 4 shows a flowchart of the 1D subsampling approach according to some embodiments. The idea is to avoid 2D decimation/interpolation for chroma components and perform 1D chroma subsampling instead. To this end, the color data is considered at the output of the serialized tree 400 as a 1D time series. To reduce the color leaking due to 2D decimation/interpolation of the chroma components, 1D decimation/interpolation is performed on the chroma components of the serialized 1D color time series. More precisely, at the encoder, after RGB to YUV conversion of the 1D color time series, in the step 402, the 1D chroma component time series is decimated by a factor of 4 (or 2) (an anti-aliasing filter is applied before decimation), in the step 404. A YUV420 image is generated afterwards, where the Luma (Chroma) samples are put into 8×8 (4×4) blocks and scanned using the snake/serpentine pattern within the blocks. The resulting image is then compressed by JPEG, in to step 406.

At the decoder side, a YUV420 image is first decoded by the JPEG decoder, in the step 420. The decoded chroma component time series are then up-sampled (e.g., zero insertion is done) by a factor of 4 (or 2) followed by the 1D interpolation, in the step 422. The resulting YUV image is then converted to RGB, in the step 424. Either the sampling rate of 4 or 2 is able to be chosen, where the former corresponds to the 4:2:0 sample layout while the latter corresponds to the 4:2:2 sample layout. Reconstructed serialized color information 426 is the output.

FIG. 2 and FIG. 3 compare the visual quality of the decoded cloud at the output of Anchor and the proposed 1D subsampling method. It is clearly observed that the color leaking is significantly mitigated using the color leaking suppression method.

RD curves of the color leaking suppression method are given in FIGS. 5A-E. In these Figures, "cm18_octree" represents the proposed 1D subsampling method with JPEG-4:2:0, "cm11_octree" denotes Anchor with JPEG-4:4:4, and "cm1_otree" represents Anchor. Results indicate that 1D subsampling always outperforms the Anchor with respect to both the chroma components and the luma components. The Anchor with JPEG-4:4:4 introduced herein outperforms 1D subsampling in some cases. However, its luma coding gain is not as good as the others, and it is not as robust at the 1D subsampling approach. Although this method works for many cases, a more general approach is to have an adaptive 2-D/1-D approach. For example, an adaptive 2-D/1-D approach is able to perform both, and then select the better result, or to perform the 1-D approach for the bulk of the coding, but use the 2-D approach when the 2-D approach typically provides better results (e.g., based on prior analysis).

Figure 6:
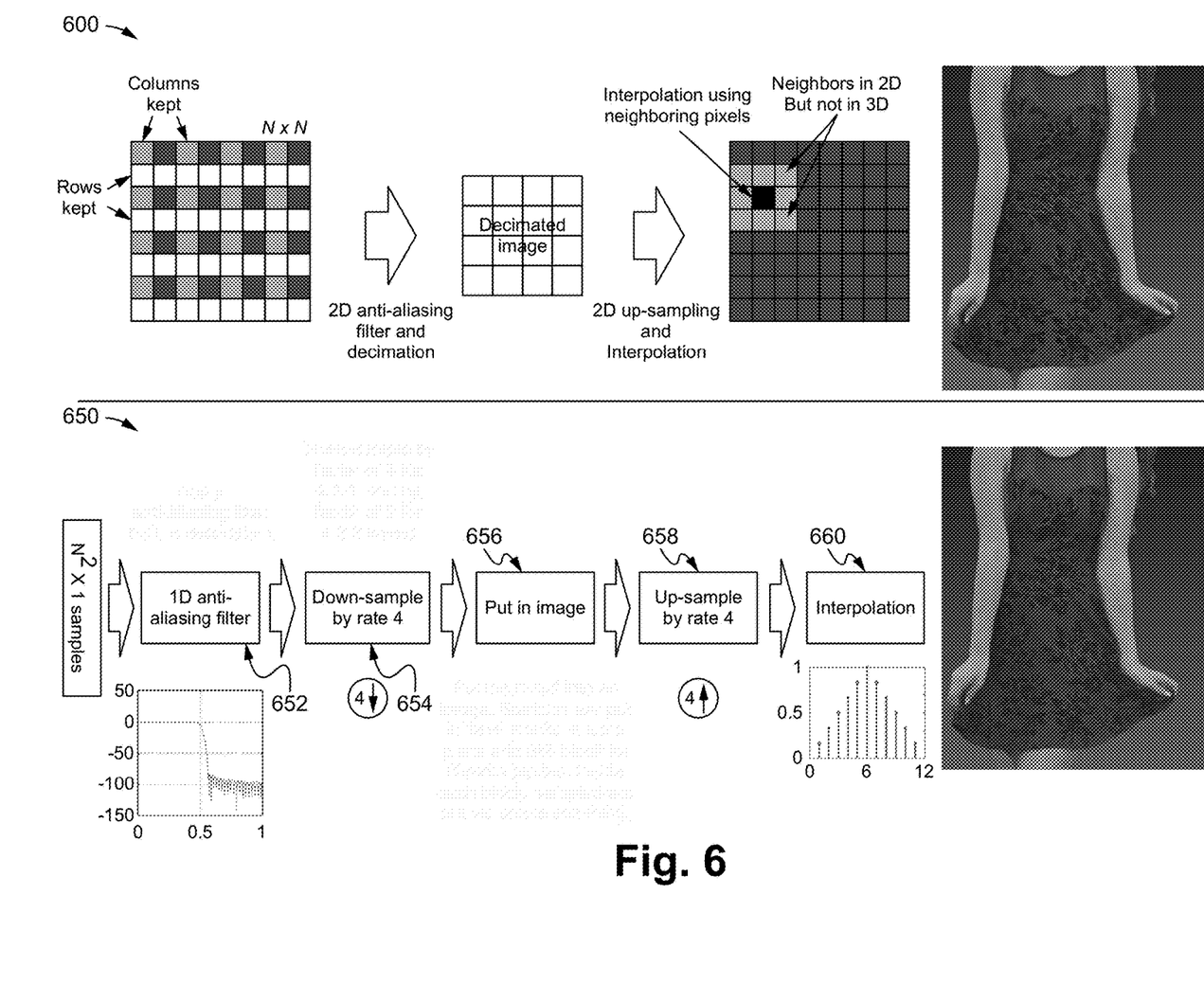
FIG. 6 illustrates a flowcharts of chroma 1D decimation/interpolation according to some embodiments.

FIG. 6 illustrates a flowcharts of chroma 1D decimation/interpolation according to some embodiments. In Anchor 600, a 2D anti-aliasing filter is applied along with decimation to generate a decimated image. Then, 2D upsampling and interpolation are used, where interpolation uses neighboring pixels. In the color leaking suppression scheme 650, an anti-aliasing filter is applied before decimation in the step 652. Then, in the step 654, down-sampling is applied by a factor of 4 for 4:2:0 and by a factor of 2 for 4:2:2 layouts. In the step 656, the result is put into an image. Samples are put into 16×16 blocks in the luma plane and 8×8 blocks for chroma planes. Inside each block, samples are put via snake scanning In the step 658, the image is up-sampled by 4. In some embodiments, the up-sampling matches the down-sampling (e.g., if down-sampled by 2, then up-sampled by 2, and if down-sampled by 4, then up-sampled by 4). In the step 660, interpolation is applied to the up-sampled image. In some embodiments, fewer or additional steps are implemented. In some embodiments, the order of the steps is modified.

Figure 7:
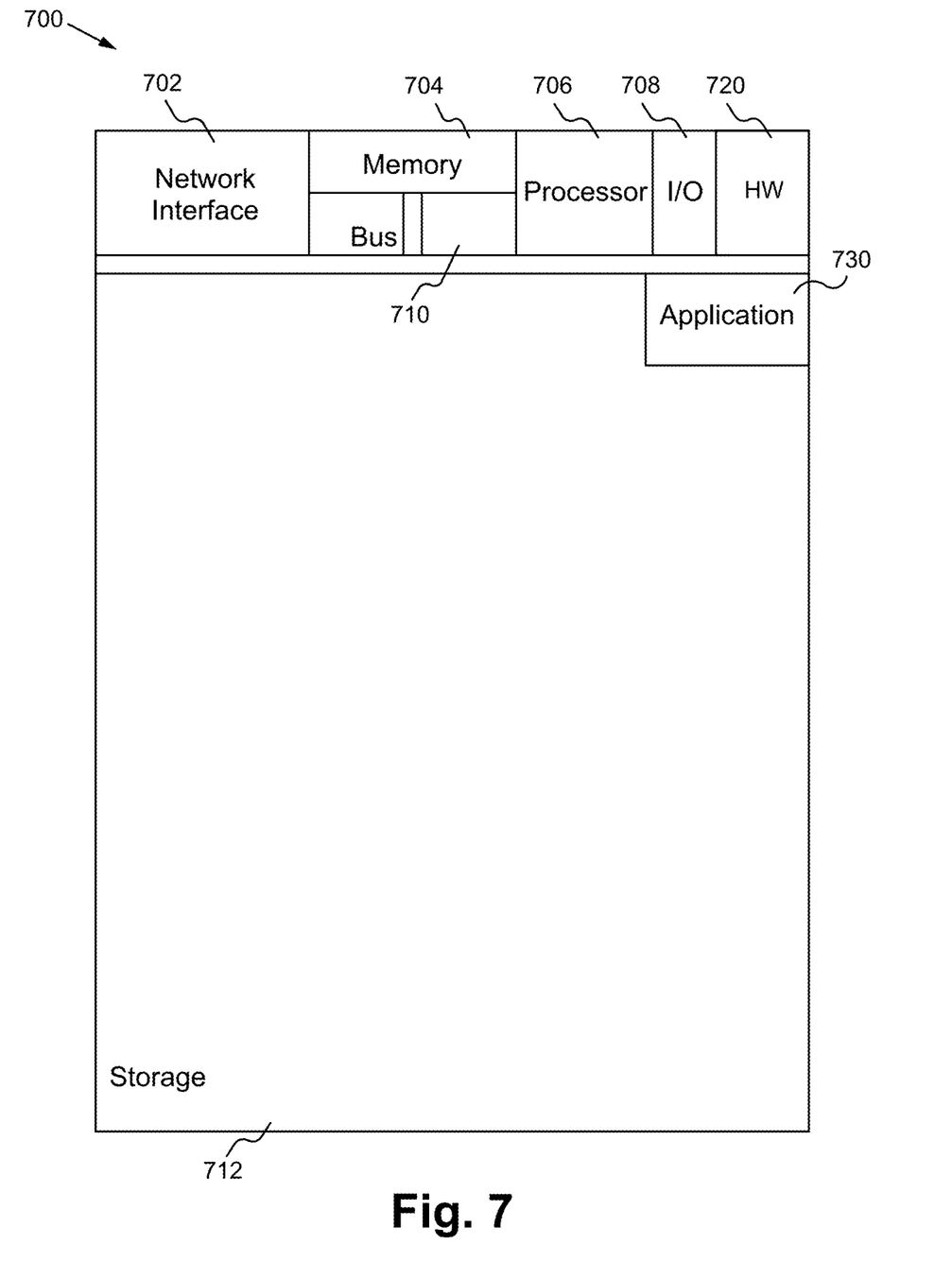
FIG. 7 illustrates a block diagram of an exemplary computing device configured to implement the color leaking suppression method according to some embodiments.

FIG. 7 illustrates a block diagram of an exemplary computing device configured to implement the color leaking suppression method according to some embodiments. The computing device 700 is able to be used to acquire, store, compute, process, communicate and/or display information such as images and videos. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Color leaking suppression application(s) 730 used to implement the color leaking suppression method are likely to be stored in the storage device 712 and memory 704 and processed as applications are typically processed. More or fewer components shown in FIG. 7 are able to be included in the computing device 700. In some embodiments, color leaking suppression hardware 720 is included. Although the computing device 700 in FIG. 7 includes applications 730 and hardware 720 for the color leaking suppression method, the color leaking suppression method is able to be implemented on a computing device in hardware, firmware, software or any combination thereof. For example, in some embodiments, the color leaking suppression applications 730 are programmed in a memory and executed using a processor. In another example, in some embodiments, the color leaking suppression hardware 720 is programmed hardware logic including gates specifically designed to implement the color leaking suppression method.

In some embodiments, the color leaking suppression application(s) 730 include several applications and/or modules. In some embodiments, modules include one or more sub-modules as well. In some embodiments, fewer or additional modules are able to be included.

In some embodiments, the color leaking suppression hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 8:
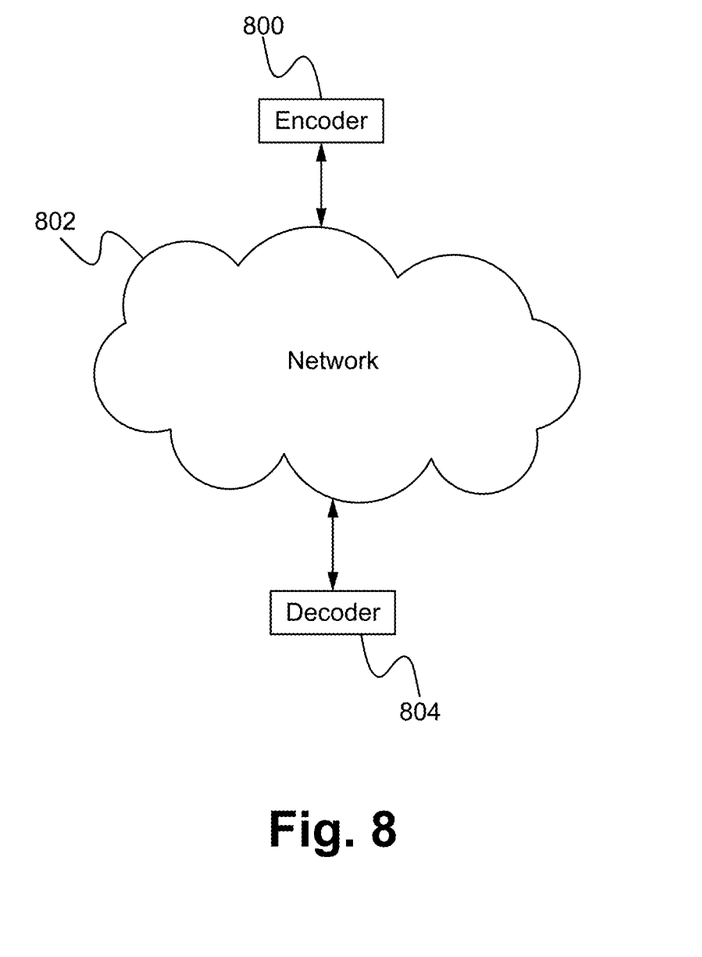
FIG. 8 illustrates a diagram of a network of devices according to some embodiments.

FIG. 8 illustrates a diagram of a network of devices according to some embodiments. Video content is encoded at one or more encoder devices 800. The encoded content is transmitted/streamed through a network 802 (e.g., the Internet, a cellular network or any other network) to one or more decoder devices 804. In some embodiments, the content is transmitted to the one or more decoder devices 804 directly without a network. The one or more devices of the network of devices (e.g., encoder device, decoder device) are configured to perform the color leaking suppression method described herein. The one or more encoder devices 800 and the one or more decoder devices 804 are able to be any device such as servers, a personal computers, smart phones, televisions, gaming systems, vehicles or any of the devices described herein or any combination of devices described herein.

To utilize the color leaking suppression method described herein, devices such as digital cameras/camcorders are used to acquire content. The color leaking suppression method is able to be implemented with user assistance or automatically without user involvement to efficiently encode the content.

In operation, the color leaking suppression minimizes color distortion in point cloud compression. Two approaches are able to mitigate the color leaking. Both approaches reduce the color leaking significantly, while one of them (e.g., 1D subsampling) is more robust and preferred in most cases. A more general approach is an adaptive selection between these two approaches.

Some Embodiments of Color Leaking Suppression in Anchor Point Cloud Compression

1. A method comprising:
   converting image data from an RGB color model to a YUV color model;
   decimating a chroma component time series of the YUV color model to generate a YUV420 image; and
   encoding the YUV420 image.
2. The method of clause 1 wherein decimating the chroma component time series is by a factor of 4 or 2, where 4 corresponds to a 4:2:0 sample layout and a 2 corresponds to a 4:2:2 sample layout.
3. The method of clause 1 wherein encoding the YUV420 image includes separating the luma and chroma samples of the YUV420 image into blocks and scanning the blocks with a snake pattern.
4. The method of clause 1 wherein encoding the YUV420 image utilizes a JPEG encoder.
5. The method of clause 1 further comprising decoding the encoded YUV420 image.
6. The method of clause 5 wherein decoding the encoded YUV420 image includes:
   decoding the encoded YUV420 image with a JPEG decoder;
   up-sampling the chroma component time series; and
   converting the YUV color model to the RGB color model to reconstruct the image data.
7. The method of clause 6 wherein up-sampling the chroma component time series is by a factor of 4 or 2, where 4 corresponds to a 4:2:0 sample layout and a 2 corresponds to a 4:2:2 sample layout.
8. The method of clause 6 wherein up-sampling the chroma component time series includes 1D interpolation.
9. An apparatus comprising:
   a non-transitory memory for storing an application, the application for:
     converting image data from an RGB color model to a YUV color model;
     decimating a chroma component time series of the YUV color model to generate a YUV420 image; and
     encoding the YUV420 image; and
   a processor coupled to the memory, the processor configured for processing the application.
10. The apparatus of clause 9 wherein decimating the chroma component time series is by a factor of 4 or 2, where 4 corresponds to a 4:2:0 sample layout and a 2 corresponds to a 4:2:2 sample layout.

11. The apparatus of clause 9 wherein encoding the YUV420 image includes separating the luma and chroma samples of the YUV420 image into blocks and scanning the blocks with a snake pattern.

12. The apparatus of clause 9 wherein encoding the YUV420 image utilizes a JPEG encoder.

13. The apparatus of clause 9 further comprising decoding the encoded YUV420 image.

14. The apparatus of clause 13 wherein decoding the encoded YUV420 image includes:
 decoding the encoded YUV420 image with a JPEG decoder;
 up-sampling the chroma component time series; and
 converting the YUV color model to the RGB color model to reconstruct the image data.

15. The apparatus of clause 14 wherein up-sampling the chroma component time series is by a factor of 4 or 2, where 4 corresponds to a 4:2:0 sample layout and a 2 corresponds to a 4:2:2 sample layout.

16. The apparatus of clause 14 wherein up-sampling the chroma component time series includes 1D interpolation.

17. A system comprising:
 a first computing device configured for:
  converting image data from an RGB color model to a YUV color model;
  decimating a chroma component time series of the YUV color model to generate a YUV420 image; and
  encoding the YUV420 image; and
 a second computing device configured for:
  decoding the encoded YUV420 image;
  up-sampling the chroma component time series; and
  converting the YUV color model to the RGB color model to reconstruct the image data.

18. The system of clause 17 wherein decimating the chroma component time series is by a factor of 4 or 2, where 4 corresponds to a 4:2:0 sample layout and a 2 corresponds to a 4:2:2 sample layout.

19. The system of clause 17 wherein encoding the YUV420 image includes separating the luma and chroma samples of the YUV420 image into blocks and scanning the blocks with a snake pattern.

20. The system of clause 17 wherein encoding the YUV420 image utilizes a JPEG encoder.

21. The system of clause 17 further comprising decoding the encoded YUV420 image.

22. The system of clause 17 wherein up-sampling the chroma component time series is by a factor of 4 or 2, where 4 corresponds to a 4:2:0 sample layout and a 2 corresponds to a 4:2:2 sample layout.

23. The system of clause 17 wherein up-sampling the chroma component time series includes 1D interpolation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
 converting image data from an RGB color model to a YUV color model;
 decimating a chroma component time series of the YUV color model to generate a YUV420 image; and
 encoding the YUV420 image, wherein encoding the YUV420 image includes separating the luma and chroma samples of the YUV420 image into blocks and scanning the blocks with a snake pattern.

2. The method of claim 1 wherein decimating the chroma component time series is by a factor of 4 or 2, where 4 corresponds to a 4:2:0 sample layout and a 2 corresponds to a 4:2:2 sample layout.

3. The method of claim 1 wherein encoding the YUV420 image utilizes a JPEG encoder.

4. The method of claim 1 further comprising decoding the encoded YUV420 image.

5. The method of claim 4 wherein decoding the encoded YUV420 image includes:
 decoding the encoded YUV420 image with a JPEG decoder;
 up-sampling the chroma component time series; and
 converting the YUV color model to the RGB color model to reconstruct the image data.

6. The method of claim 5 wherein up-sampling the chroma component time series is by a factor of 4 or 2, where 4 corresponds to a 4:2:0 sample layout and a 2 corresponds to a 4:2:2 sample layout.

7. The method of claim 5 wherein up-sampling the chroma component time series includes 1D interpolation.

8. An apparatus comprising:
 a non-transitory memory for storing an application, the application for:
  converting image data from an RGB color model to a YUV color model;
  decimating a chroma component time series of the YUV color model to generate a YUV420 image; and
  encoding the YUV420 image, wherein encoding the YUV420 image includes separating the luma and chroma samples of the YUV420 image into blocks and scanning the blocks with a snake pattern; and
 a processor coupled to the memory, the processor configured for processing the application.

9. The apparatus of claim 8 wherein decimating the chroma component time series is by a factor of 4 or 2, where 4 corresponds to a 4:2:0 sample layout and a 2 corresponds to a 4:2:2 sample layout.

10. The apparatus of claim 8 wherein encoding the YUV420 image utilizes a JPEG encoder.

11. The apparatus of claim 8 further comprising decoding the encoded YUV420 image.

12. The apparatus of claim 11 wherein decoding the encoded YUV420 image includes:
 decoding the encoded YUV420 image with a JPEG decoder;
 up-sampling the chroma component time series; and
 converting the YUV color model to the RGB color model to reconstruct the image data.

13. The apparatus of claim 12 wherein up-sampling the chroma component time series is by a factor of 4 or 2, where 4 corresponds to a 4:2:0 sample layout and a 2 corresponds to a 4:2:2 sample layout.

14. The apparatus of claim 12 wherein up-sampling the chroma component time series includes 1D interpolation.

15. A system comprising:
 a first computing device configured for:
  converting image data from an RGB color model to a YUV color model;
  decimating a chroma component time series of the YUV color model to generate a YUV420 image; and
  encoding the YUV420 image, wherein encoding the YUV420 image includes separating the luma and chroma samples of the YUV420 image into blocks
and scanning the blocks with a snake pattern; and
a second computing device configured for:
  decoding the encoded YUV420 image;
  up-sampling the chroma component time series; and
  converting the YUV color model to the RGB color model to reconstruct the image data.

16. The system of claim 15 wherein decimating the chroma component time series is by a factor of 4 or 2, where 4 corresponds to a 4:2:0 sample layout and a 2 corresponds to a 4:2:2 sample layout.

17. The system of claim 15 wherein encoding the YUV420 image utilizes a JPEG encoder.

18. The system of claim 15 further comprising decoding the encoded YUV420 image.

19. The system of claim 15 wherein up-sampling the chroma component time series is by a factor of 4 or 2, where 4 corresponds to a 4:2:0 sample layout and a 2 corresponds to a 4:2:2 sample layout.

20. The system of claim 15 wherein up-sampling the chroma component time series includes 1D interpolation.

\* \* \* \* \*